United States Patent
Lyon

(10) Patent No.: US 9,584,473 B2
(45) Date of Patent: *Feb. 28, 2017

(54) FACILITATING CONTENT ACCESSIBILITY VIA DIFFERENT COMMUNICATION FORMATS

(71) Applicant: Fortinet, Inc., Sunnyvale, CA (US)

(72) Inventor: Barrett Gibson Lyon, Pacifica, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/452,682

(22) Filed: Aug. 6, 2014

(65) Prior Publication Data

US 2014/0344417 A1 Nov. 20, 2014

Related U.S. Application Data

(63) Continuation of application No. 13/194,826, filed on Jul. 29, 2011.

(51) Int. Cl.
*G06F 15/177* (2006.01)
*H04L 29/12* (2006.01)
(Continued)

(52) U.S. Cl.
CPC ............ *H04L 61/251* (2013.01); *H04L 43/50* (2013.01); *H04L 67/10* (2013.01);
(Continued)

(58) Field of Classification Search
CPC ... H04L 61/251; H04L 61/6068; H04L 43/50; H04L 67/10
(Continued)

(56) References Cited

U.S. PATENT DOCUMENTS 6,085,193 A 7/2000 Malkin et al.
6,785,704 B1 8/2004 McCanne
(Continued)

FOREIGN PATENT DOCUMENTS

WO 2003055178 7/2003

OTHER PUBLICATIONS

Final Rejection for U.S. Appl. No. 13/246,741 mailed Apr. 14, 2012.
(Continued)

*Primary Examiner* — Frantz Jean
(74) *Attorney, Agent, or Firm* — Hamilton, DeSanctis & Cha LLP

(57) ABSTRACT

Methods and systems for facilitating content accessibility via different communication formats are provided. According to one embodiment, a method is provided for directing content requests to an appropriate content delivery network. A content request is received from a client. The content request relates to web page content published by a content publisher in an Internet Protocol version 4 (IPv4) format or an Internet Protocol version 6 (IPv6) format that is obtained by the content delivery network from the content publisher and is translated to the other format by the content delivery network prior to receiving any content requests for the web page content. A communication format through which the client is capable of communicating is determined. The content request is directed to a content delivery network that supports the communication format through which the client is capable of communicating.

18 Claims, 6 Drawing Sheets

(51) Int. Cl.
    *H04L 29/08*    (2006.01)
    *H04L 29/06*    (2006.01)
    *H04L 12/26*    (2006.01)

(52) U.S. Cl.
    CPC ........ *H04L 67/2814* (2013.01); *H04L 69/167*
        (2013.01); *H04L 61/6068* (2013.01)

(58) Field of Classification Search
    USPC .................. 709/224, 230, 245; 370/246, 401
    See application file for complete search history.

(56) References Cited

U.S. PATENT DOCUMENTS

| | | | |
|---|---|---|---|
| 6,871,236 B2 | 3/2005 | Fishman et al. | |
| 7,305,252 B2 | 12/2007 | Britt et al. | |
| 7,391,768 B1* | 6/2008 | Samprathi et al. | 370/389 |
| 7,436,776 B2 | 10/2008 | Koga | |
| 7,483,941 B2* | 1/2009 | Carlson et al. | 709/203 |
| 7,526,562 B1 | 4/2009 | Samprathi et al. | |
| 7,543,052 B1 | 6/2009 | Cesa | |
| 7,653,689 B1 | 1/2010 | Champagne et al. | |
| 7,657,642 B2 | 2/2010 | Blanchet | |
| 7,684,382 B2 | 3/2010 | Ishii et al. | |
| 7,860,964 B2 | 12/2010 | Brady et al. | |
| 8,151,002 B2* | 4/2012 | Suzuki et al. | 709/245 |
| 8,429,630 B2 | 4/2013 | Nickolov et al. | |
| 8,861,525 B1* | 10/2014 | Durand | H04L 61/251 370/392 |
| 9,083,652 B2 | 7/2015 | Lyon | |
| 9,178,749 B2* | 11/2015 | Levine | H04L 29/12066 |
| 9,331,979 B2 | 5/2016 | Lyon | |
| 2002/0010783 A1 | 1/2002 | Primak et al. | |
| 2002/0099957 A1 | 7/2002 | Kramer et al. | |
| 2002/0161890 A1 | 10/2002 | Chen | |
| 2003/0014503 A1 | 1/2003 | Legout et al. | |
| 2003/0046703 A1 | 3/2003 | Knowles et al. | |
| 2003/0149581 A1 | 8/2003 | Chaudhri et al. | |
| 2004/0001509 A1* | 1/2004 | Zhang | H04L 69/167 370/466 |
| 2004/0233916 A1 | 11/2004 | Takeuchi et al. | |
| 2005/0010537 A1 | 1/2005 | Ettinger | |
| 2005/0267978 A1 | 12/2005 | Satapati | |
| 2006/0015647 A1 | 1/2006 | Kang et al. | |
| 2006/0104226 A1 | 5/2006 | Ahn | |
| 2006/0123079 A1 | 6/2006 | Sturnolio et al. | |
| 2006/0242072 A1 | 10/2006 | Peled et al. | |
| 2007/0055765 A1 | 3/2007 | Lisiecki et al. | |
| 2007/0081512 A1 | 4/2007 | Takeda et al. | |
| 2007/0168440 A1 | 7/2007 | Cobelens | |
| 2007/0294419 A1 | 12/2007 | Ulevitch | |
| 2008/0215718 A1 | 9/2008 | Stolorz et al. | |
| 2009/0055891 A1 | 2/2009 | Okamoto et al. | |
| 2009/0086668 A1 | 4/2009 | Guan | |
| 2009/0262741 A1 | 10/2009 | Jungck et al. | |
| 2009/0276771 A1 | 11/2009 | Nickolov et al. | |
| 2009/0327517 A1 | 12/2009 | Sivasubramanian et al. | |
| 2010/0042743 A1 | 2/2010 | Jeon et al. | |
| 2010/0260203 A1 | 10/2010 | Moon et al. | |
| 2010/0325240 A1 | 12/2010 | Drako et al. | |
| 2011/0013631 A1 | 1/2011 | Frydman et al. | |
| 2011/0013647 A1 | 1/2011 | Park et al. | |
| 2011/0016214 A1 | 1/2011 | Jackson | |
| 2011/0154443 A1 | 6/2011 | Thakur et al. | |
| 2011/0271007 A1 | 11/2011 | Wang et al. | |
| 2013/0103520 A1 | 4/2013 | Lyon | |
| 2013/0103556 A1 | 4/2013 | Lyon | |
| 2013/0103784 A1 | 4/2013 | Lyon | |
| 2013/0103785 A1 | 4/2013 | Lyon | |
| 2013/0103805 A1 | 4/2013 | Lyon | |
| 2013/0103848 A1 | 4/2013 | Lyon | |
| 2013/0103853 A1 | 4/2013 | Lyon | |
| 2013/0212266 A1 | 8/2013 | Lyon | |
| 2013/0254333 A1 | 9/2013 | Lyon | |
| 2013/0254385 A1 | 9/2013 | Lyon | |
| 2014/0304386 A1 | 10/2014 | Lyon | |
| 2015/0095491 A1 | 4/2015 | Lyon | |
| 2015/0312746 A1 | 10/2015 | Lu et al. | |

OTHER PUBLICATIONS

Non-Final Rejection for U.S. Appl. No. 13/246,741 mailed Nov. 16, 2011.
Final Rejection for U.S. Appl. No. 14/306,176 mailed Mar. 19, 2015.
Non-Final Rejection for U.S. Appl. No. 14/306,176 mailed Sep. 19, 2014.
Notice of Allowance for U.S. Appl. No. 13/244,722 mailed Jun. 11, 2015.
Final Rejection for U.S. Appl. No. 13/849,031 mailed Apr. 29, 2015.
Final Rejection for U.S. Appl. No. 13/849,031 mailed Mar. 17, 2015.
Non-Final Rejection for U.S. Appl. No. 13/849,525 mailed Mar. 27, 2015.
Non-Final Rejection for U.S. Appl. No. 13/246,741 mailed Mar. 27, 2015.
Final Rejection for U.S. Appl. No. 13/019,953 mailed Jun. 23, 2015.
Final Rejection for U.S. Appl. No. 13/194,825 mailed Oct. 9, 2014.
Non-Final Rejection for U.S. Appl. No. 13/194,825 mailed Jun. 16, 2014.
Final Rejection for U.S. Appl. No. 13/194,825 mailed Aug. 8, 2013.
IPv6 Tunnel Broker with the Tunnel Setup Protocol (TSP), RFC 5572 submitted on Feb. 2010.
Evaluation of IPv6 Auto-Transition Algorithm, IETF Internal-Draft submitted on Oct. 24, 2004.
Final Rejection for U.S. Appl. No. 13/246,741 mailed Aug. 7, 2014.
Non-Final Rejection for U.S. Appl. No. 13/246,741 mailed Dec. 20, 2012.
Non-Final Rejection for U.S. Appl. No. 13/194,826 mailed Aug. 11, 2014.
Final Rejection for U.S. Appl. No. 13/194,826 mailed Oct. 2, 2013.
Non-Final Rejection for U.S. Appl. No. 13/194,826 mailed Apr. 3, 2013.
Non-Final Rejection for U.S. Appl. No. 13/194,825 mailed Feb. 27, 2013.
Final Rejection for U.S. Appl. No. 13/020,762 mailed Oct. 23, 2014.
Non-Final Rejection for U.S. Appl. No. 13/020,762 mailed Apr. 11, 2014.
Final Rejection for U.S. Appl. No. 13/020,762 mailed Aug. 8, 2013.
Non-Final Rejection for U.S. Appl. No. 13/020,762 mailed Mar. 1, 2013.
Non-Final Rejection for U.S. Appl. No. 13/849,031 mailed Nov. 5, 2014.
Non-Final Rejection for U.S. Appl. No. 13/019,953 mailed Oct. 26, 2012.
Non-Final Rejection for U.S. Appl. No. 13/244,722 mailed Dec. 16, 2014.
Non-Final Rejection for U.S. Appl. No. 13/244,722 mailed Nov. 10, 2011.
Final Rejection for U.S. Appl. No. 12/655,900 mailed Nov. 8, 2012.
Non-Final Rejection for U.S. Appl. No. 12/655,900 mailed Mar. 2, 2012.
Requirement for Restriction/Election for U.S. Appl. No. 12/655,900 mailed Nov. 10, 2011.
Requirement for Restriction/Election for U.S. Appl. No. 13/020,762 mailed Jan. 7, 2013.
Examiner's Answer to Appeal for U.S. Appl. No. 13/194,825 mailed Sep. 4, 2016.
Appeal Brief for U.S. Appl. No. 13/194,825, filed May 9, 2015.
Appeal Brief for U.S. Appl. No. 13/849,525, filed Jan. 27, 2016.
Examiner's Answer to Appeal for U.S. Appl. No. 13/020,762 mailed Jun. 26, 2015.
Appeal Brief for U.S. Appl. No. 13/020,762, filed Feb. 16, 2015.
Examiner's Answer to Appeal for U.S. Appl. No. 14/306,176 mailed Feb. 2, 2016.
Appeal Brief for U.S. Appl. No. 14/306,176, filed Sep. 15, 2015.

(56) References Cited

OTHER PUBLICATIONS

Examiner's Answer to Appeal for U.S. Appl. No. 13/849,031 mailed Feb. 1, 2016.
Appeal Brief for U.S. Appl. No. 14/306,176, filed Aug. 26, 2015.
Examiner's Answer to Appeal for U.S. Appl. No. 13/019,953 mailed Mar. 22, 2016.
Appeal Brief for U.S. Appl. No. 13/019,953, filed Nov. 30, 2015.
Notice of Allowance for U.S. Appl. No. 14/613,187 mailed Mar. 15, 2016.
Notice of Allowance for U.S. Appl. No. 14/613,187 mailed Mar. 15, 2013.
Non-Final Rejection for U.S. Appl. No. 14/546,770 mailed Apr. 22, 2016.
Final Rejection for U.S. Appl. No. 14/546,770 mailed Sep. 30, 2016.
Non-Final Rejection for U.S. Appl. No. 13/194,826 mailed Sep. 9, 2016.

\* cited by examiner

FACILITATING CONTENT ACCESSIBILITY VIA DIFFERENT COMMUNICATION FORMATS

CROSS-REFERENCE TO RELATED APPLICATIONS

This application is a continuation of U.S. patent application Ser. No. 13/194,826 filed on Jul. 29, 2011, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2011-2014, Fortinet, Inc.

BACKGROUND

Field

Embodiments of the present invention generally relate to facilitating content accessibility via different communication formats. In particular, embodiments of the present invention relate to proactively translating content originally received from an IPv4 enabled server in IPv4 format to an IPv6 format to facilitate accessibility via IPv6.

Description of the Related Art

Despite the commencement of a shift towards IPv6 (Internet Protocol version 6), many Internet resources are still only accessible via IPv4 (Internet Protocol version 4) due to the complexity and expense of transitioning to IPv6.

SUMMARY

Methods and systems are described for facilitating content accessibility via different communication formats. According to one embodiment, a method is provided for directing content requests to an appropriate content delivery network. A content request is received from a client. The content request relates to web page content published by a content publisher in an Internet Protocol version 4 (IPv4) format or an Internet Protocol version 6 (IPv6) format that is obtained by the content delivery network from the content publisher and is translated to the other format by the content delivery network prior to receiving any content requests for the web page content. A communication format through which the client is capable of communicating is determined. The content request is directed to a content delivery network that supports the communication format through which the client is capable of communicating.

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Methods and systems are described for facilitating content accessibility via different communication formats. Embodiments of the present invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

As the long-anticipated address exhaustion of IPv4 (Internet Protocol version 4) becomes imminent, mechanisms to transition to IPv6 (Internet Protocol version 6) have become increasingly prevalent. Although many networking devices are now dual stack and support both IPv4 and IPv6, most existing ISP (Internet Service Provider) networks still only support native IPv4 connectivity. As a result, a very small percentage of existing Internet traffic comprises solely native IPv6 traffic. Rather, a significant portion of existing IPv6 traffic employs a tunneling mechanism to carry IPv6 traffic over an IPv4 network.

Figure 1:
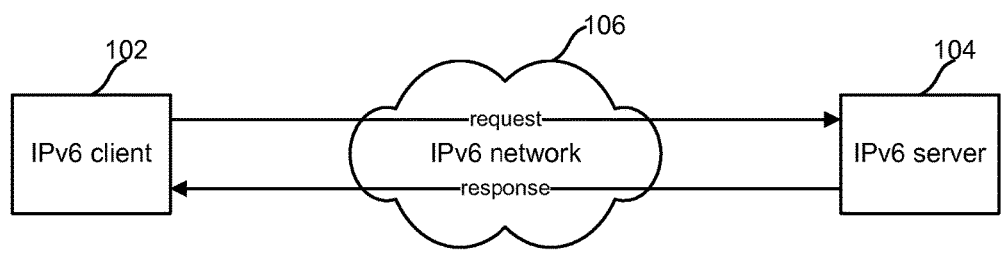
FIG. 1 is a block diagram illustrating an example of native IPv6 traffic communications between an IPv6 enabled client and server.

FIG. 1 is a block diagram illustrating an example of native IPv6 traffic communications between an IPv6 enabled client and server. As depicted, a request from IPv6 enabled client 102 is received by IPv6 enabled server 104 via IPv6 network 106, and a response to the request from IPv6 enabled server 104 is received by IPv6 enabled client 102 via IPv6 network 106. The communications between client 102 and server 104 are facilitated by one or more ISPs that are natively connected to IPv6 backbone 106. Although described as IPv6 enabled, client 102 and server 104 may also be enabled to communicate via one or more other protocol stacks such as IPv4. Similar communications as those described with respect to FIG. 1 occur with respect to native communications using other protocol stacks such as IPv4.

Figure 2:
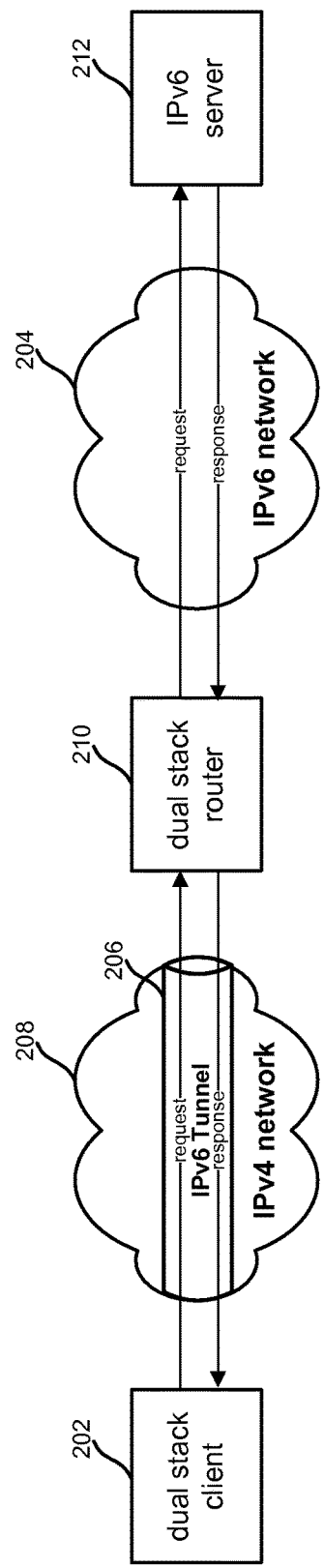
FIG. 2 is a block diagram illustrating an example of IPv6 communications via an IPv6 tunnel over an IPv4 backbone.

In contrast, FIG. 2 is a block diagram illustrating an example of IPv6 communications via an IPv6 tunnel over an IPv4 backbone. Tunneling effectively facilitates encapsulation of IPv6 packets within IPv4 so that existing IPv4 infrastructure may be employed to carry IPv6 packets to reach an IPv6 network. In the given example, dual stack client 202 is IPv6 capable but limited, for example, by an associated ISP, to IPv4 network connectivity. Client 202 employs a tunnel broker service that enables connectivity to IPv6 network 204 via a tunnel 206 over IPv4 network 208. Specifically, a request to an IPv6 destination from client 202 is tunneled 206 over IPv4 network 208 to a dual stack router 210 of the tunnel broker service, which provides connectivity to IPv6 network 204 and which directs the request from client 202 via IPv6 network 204 to IPv6 server 212. A response to the request from IPv6 server 212 is received via IPv6 network 204 by dual stack router 210 and directed via tunneling 206 over IPv4 network 208 to client 202.

In many cases, IPv6 tunneling over an IPv4 network introduces performance degradations, for example, due to the latency inherent in the extra transmissions as well as performance limitations imposed by tunnel broker service gateways (e.g., router 210 of FIG. 2) that facilitate communications with an IPv6 network. Due to the poor performance typically resulting from such tunneling techniques, IPv6 has yet to receive more widespread deployment. Despite the performance limitations, many Internet resources (e.g., websites) have nevertheless become IPv6 enabled, for example, due in part to a desire to be at the forefront of migration to IPv6. As a result, many domain names are accessible via both IPv4 and IPv6 addresses. In DNS (Domain Name System), domain names are mapped to an IPv4 address using an A record and to an IPv6 address using an AAAA (quad A) record. In some cases, default and/or user configurations of client hardware and/or software have resulted in domain names being automatically resolved into IPv6 addresses, if available, regardless of whether native IPv6 network connectivity exists at the client. Such indiscriminate use of IPv6 has in many cases detrimentally impacted end user experience, especially for clients that are not natively connected to an IPv6 network.

Techniques for more intelligently routing or directing traffic based on expected performance are disclosed herein. Although dual stack devices capable of communicating using IPv4 and/or IPv6 are described in some of the given examples, the techniques disclosed herein may be employed with respect to any device capable of communicating using any one or more protocol stacks or communication formats.

Figure 3:
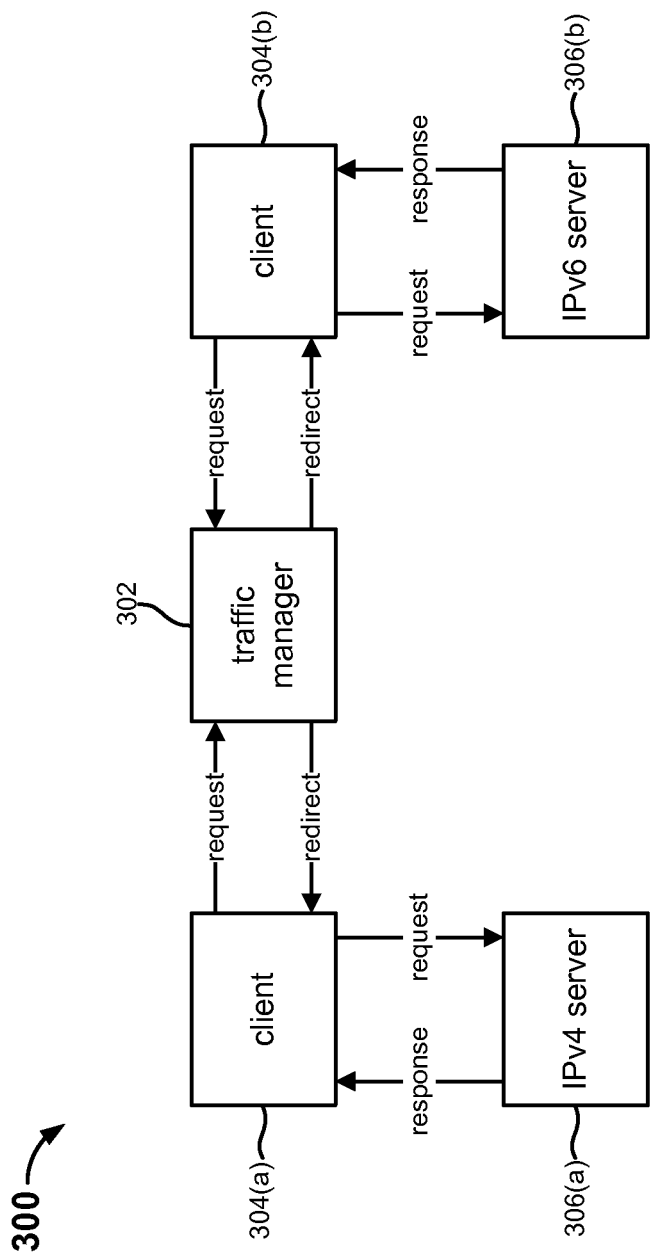
FIG. 3 is a block diagram illustrating an embodiment of a network environment in which clients are intelligently directed to servers capable of servicing client requests.

FIG. 3 is a block diagram illustrating an embodiment of a network environment in which clients are intelligently directed to servers capable of servicing client requests. The various components comprising network environment 300 communicate via one or more private and/or public networks using any appropriate communication protocols and comprise devices that are capable of communicating using any one or more communication formats. For instance, one or more of components 302-306 may comprise dual stack devices that are enabled for both the IPv4 and IPv6 protocol stacks. Such a dual stack device may be configured, for example, to automatically communicate via IPv4 or IPv6 depending on whether the IP address of a destination device comprises an IPv4 or IPv6 address. Although components may be depicted as single blocks in the accompanying figures, in various embodiments, a block may comprise any number of interconnected physical and/or logical components. For instance, in some embodiments, traffic manager 302 comprises a plurality of networked devices located in different geographical regions.

Traffic in network environment 300 is managed by traffic manager 302. In some embodiments, traffic manager 302 comprises a redirection node or host configured to direct a client 304 to an appropriate server 306 capable of servicing a client request. Traffic manager 302 may be employed by a publisher to manage client requests for content published by the publisher. In such cases, client requests for content published by the publisher may be directed or redirected to traffic manager 302, for example, via a CNAME (Canonical Name) record of DNS. Traffic manager 302, in turn, redirects clients 304 to appropriate servers 306 to service client requests. For example, traffic manager 302 may redirect a client in a manner that strives to optimize performance in servicing the client request and/or according to a traffic management policy specified by an associated publisher whose content is being requested. In some embodiments, traffic manager 302 is natively connected to a plurality of networks and/or capable of communicating via a plurality of communication formats such as IPv4 and IPv6. Although described as a centralized, web-based service with respect to the example of FIG. 3, the functionality described herein as being performed by traffic manager 302 may in other embodiments be implemented as a host-based solution, for example, on servers 306.

Server 306(a) and server 306(b) are configured to serve content. For example, server 306(a) and server 306(b) may be configured to serve content published by a publisher. In such cases, servers 306(a) and 306(b) may belong to the publisher (e.g., the servers may comprise publisher origin servers), a content delivery network (CDN) contracted by the publisher, or another third party entity employed to serve content on behalf of the publisher. Each of servers 306(a) and 306(b) is configured to communicate via a prescribed communication format. In the given example, server 306(a) is configured to communicate via IPv4 while server 306(b) is configured to communicate via IPv6. Although depicted in FIG. 3 as separate blocks or devices, in other embodiments, servers 306(a) and 306(b) may comprise a single device, such as a dual stack device configured to communicate natively with both IPv4 and IPv6 networks.

In some embodiments, traffic manager 302 takes into consideration the communication format that gives a client the best expected performance when making a redirection decision. In some cases, for example, better performance may be expected by redirecting a client to a server connected to a network to which the client is natively connected. For instance, better performance may be expected by redirecting a native IPv4 client 304(a) to a native IPv4 server 306(a) and similarly a native IPv6 client 304(b) to a native IPv6 server 306(b) to avoid the performance degradations inherent in tunneling communications over otherwise incompatible networks. In some embodiments, traffic manager 302 is configured to determine whether a communication received from a client has been tunneled using a tunneling service. A tunneled communication may be identified, for example, by comparing a source IP address of the communication with a list or database of known IP addresses associated with tunneling services. In some embodiments, a client identified by traffic manager 302 to be using a tunneling service may be redirected by traffic manager 302 to a server connected to a network to which the client has native connectivity so that further tunneling can be avoided.

As an example, consider a dual stack client 304(a) natively connected to only an IPv4 network but configured to communicate via IPv6 whenever an IPv6 destination is available, e.g., whenever a destination domain name is resolvable into an IPv6 address. In this example, client 304(a) connects to an IPv6 destination using a tunneling service that directs IPv6 communications to and from client 304(a) via an IPv6 tunnel over an IPv4 network and via a dual stack router of the tunneling service that is natively connected to both IPv4 and IPv6 networks as described above with respect to FIG. 2. An IPv6 communication from client 304(a) is received by traffic manager 302 via a native IPv6 network. The source IPv6 address of such a communication from the client, however, comprises the IPv6 address of the tunneling service router. By comparing the source IP address of a received communication from client 304(a) against a list of known IP addresses of tunneling service routers, traffic manager 302 is able to deduce the use of a tunneling service and that client 304(a) does not have native connectivity to an IPv6 network. If the performance of tunneled communications is expected to be inferior to communications over a native network, traffic manager 302 may choose to redirect client 304(a) to IPv4 server 306(a) so that further tunneling can be avoided. In some such cases, a redirect response from traffic manager 302 to client 304(a) may be tunneled, but subsequent request and response communications between client 304(a) and server 306(a) occur over a native network of both devices. A similar decision by traffic manager 302 to prevent further tunneling may arise in the inverse scenario. For example, a client 304(b) natively connected to only an IPv6 network and communicating with IPv4 using a tunneling service that directs IPv4 communications to and from client 304(b) via an IPv4 tunnel over an IPv6 network and via a dual stack router of the tunneling service that is natively connected to both IPv6 and IPv4 networks may be redirected by traffic manager 302 to IPv6 server 306(b) so that tunneling can be avoided during client-server communications.

In some embodiments, a determination by traffic manager 302 of the manner in which to redirect a client 304 is generally based on optimizing expected performance. Although in some cases avoiding tunneling may be expected to optimize performance, tunneling may offer improved performance in some scenarios. For example, tunneling may be expected to provide improved performance when a native network is experiencing outages or is congested, or, for instance, if the nodes involved in tunneled communications are all geographically located in closer proximity than the nodes involved in corresponding native communications. Thus, if tunneled communications are expected to result in improved performance, traffic manager 302 may redirect a client to a server that entails tunneled communications between the two devices. For example, IPv4 client 304(a) may be redirected by traffic manager 302 to IPv6 server 306(b) and likewise an IPv6 client 304(b) may be redirected by traffic manager 302 to IPv4 server 306(a).

In various embodiments, traffic manager 302 may facilitate and/or mediate client-server communications with respect to any communication protocols such as HTTP (Hypertext Transfer Protocol), SSL (Secure Sockets Layer), FTP (File Transfer Protocol), RTMP (Real Time Messaging Protocol), RTMP-E (Encrypted Real Time Messaging Protocol), RTMP over HTTP, torrent style protocols, DNS protocols, etc. In some embodiments, traffic manager 302 is at least in part configured with DNS functionality. For example, traffic manager 302 may be employed to resolve or aid in resolving DNS requests from clients 304. In some such cases, an expected optimal protocol stack for communication may be selected by traffic manager 302 for a client 304 at the DNS level, and traffic manager 302 may accordingly respond to a DNS request from a client 304 with an appropriate DNS response such as an A record or an AAAA record for IPv4 and IPv6, respectively.

Most existing network devices are dual stack and capable of communicating via both IPv4 and IPv6. However, all devices may not be dual stack in the future once migration to IPv6 is complete. In such cases, any appropriate techniques to determine whether a device is dual stack may be employed. Such techniques may generally be employed to determine whether a device supports any one or more communication formats. In some embodiments, test content accessible only via a prescribed communication format is embedded in a resource such as a web page accessed by a client to determine whether the client is capable of accessing the test content and thus to deduce whether the client is capable of communicating using the prescribed communication format. For example, IPv4 and/or IPv6 test content may be embedded into a web page accessed by a client to determine whether the client is capable of communicating via IPv4, IPv6, or both. The results of such tests may be stored in one or more browser cookies at the client so that the tests do not have to be repeatedly performed for the same client at least until the cookies expire. A client is intelligently redirected to an appropriate server based on the communication format or protocol stack via which it is capable of most efficiently communicating.

In some embodiments, various types of information may be learned and/or stored by traffic manager 302. For example, lists of known or determined native IP (e.g., IPv4 and IPv6) addresses may be maintained in databases. Such databases of native IP addresses may be employed, for example, when determining whether client communications comprise native or tunneled communications. In some cases, client information such as IP addresses and compatible protocol stacks may be learned and stored for future use so that such information does not have to be repeatedly determined for a particular client and may only periodically be re-checked for changes. In various embodiments, any other appropriate metrics may be tracked and later used for making more dynamic and granular redirection decisions.

Figure 4:
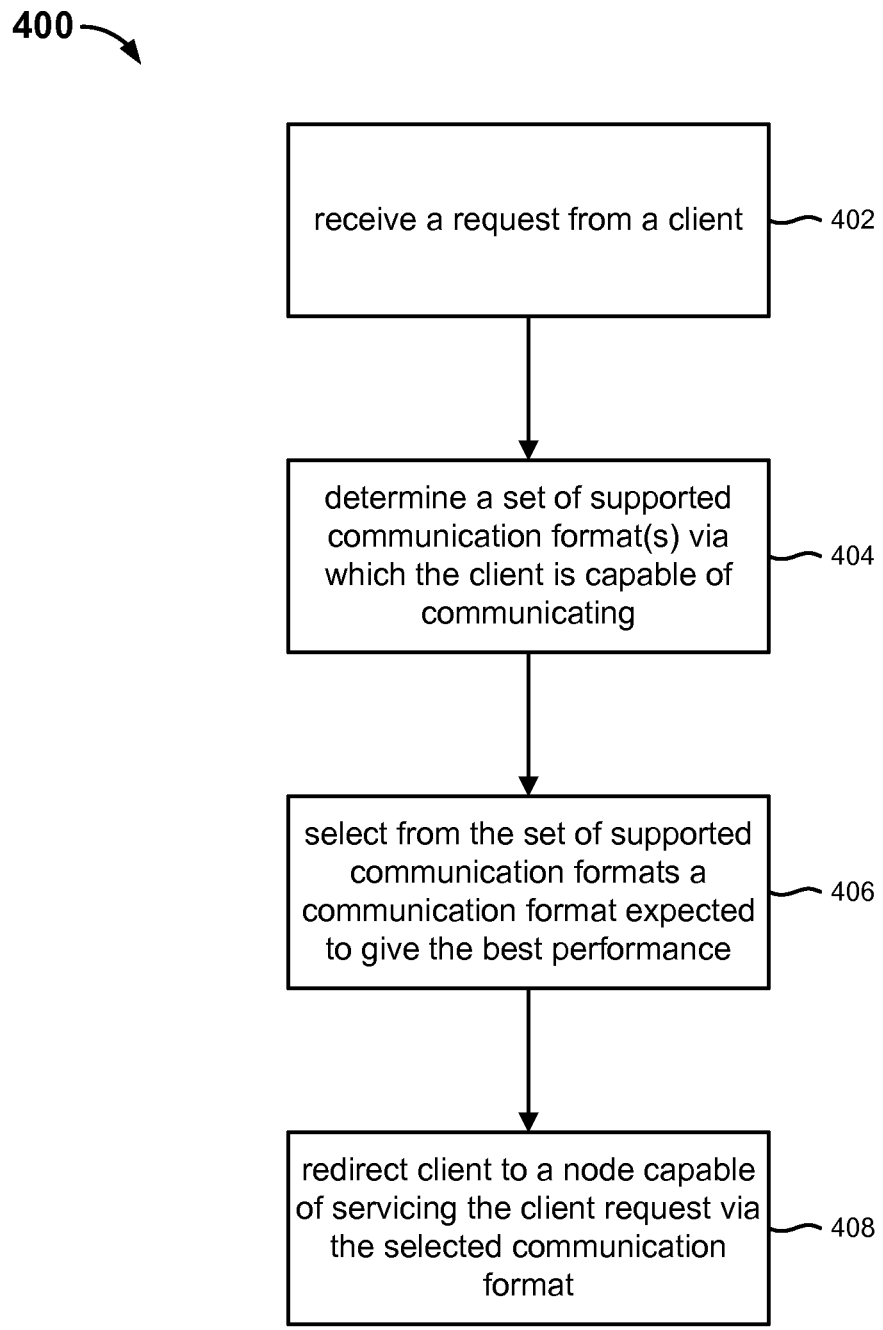
FIG. 4 is a flow chart illustrating an embodiment of a process for directing a client.

FIG. 4 is a flow chart illustrating an embodiment of a process for directing a client. In some embodiments, process 400 is employed by a traffic manager, such as traffic manager 302 of FIG. 3. Process 400 starts at step 402 at which a request is received from a client. In various embodiments, the request received at step 402 may comprise a request for any appropriate resource such as a content request or a DNS request and may be communicated via any appropriate communication protocol. At step 404, a set of one or more supported communication formats via which the client is capable of communicating are determined. For instance, step 404 may include various techniques for determining whether the client is IPv4 enabled, IPv6 enabled, or dual stack. In some embodiments, step 404 includes determining whether the source IP address of the received request is part of a list of IP addresses associated with tunneling services and/or a list of known native IP addresses. In some such cases, if the source IP address is found to be associated with a tunneling service, it is deduced that the client is dual stack. In some embodiments, step 404 includes determining the ability of the client to access a set of test content each of which is accessible via a prescribed communication format as described above. At step 406, a communication format that is expected to give the client the best performance is selected from the set of supported communication formats determined at step 404. For example, a communication format that allows the client to communicate via a network to which it is natively connected may be selected at step 406 if communication via a native network is expected to provide better performance. Alternatively, a communication format that requires a client to communicate via tunneling may be selected at step 406 if communication via a native network is expected to provide inferior performance. At step 408, the client is directed or redirected to a node capable of servicing the client request via the communication format selected at step 406.

As a result of process 400, for example, a native IPv4 client (including a native IPv4 client communicating via IPv6 tunneling) may be redirected to a native IPv4 server, and a native IPv6 client (including a native IPv6 client communicating via IPv4 tunneling) may be redirected to a native IPv6 server. Alternatively, if tunneling is expected to provide better performance than communications over a native network, a client may be redirected using process 400 to a server that entails tunneled communications between the devices. For example, a native IPv4 client (including a native IPv4 client already communicating via IPv6 tunneling) may be redirected to a native IPv6 server, and a native IPv6 client (including a native IPv6 client already communicating via IPv4 tunneling) may be redirected to a native IPv4 server. In general, process 400 may be employed to select and direct a client via one of a plurality of possible network routes that is expected to give optimal performance.

Numerous existing Internet resources such as web servers are only IPv4 enabled. It may be desirable for such resources to be IPv6 enabled as well. For example, a server associated with a publisher may only be capable of natively communicating via an IPv4 network, but the publisher may desire that its content also be natively accessible via IPv6. In some embodiments, a proxy server that translates content defined in a first format into a second format is employed to make a resource natively accessible in the second format. For example, a proxy server natively connected to both IPv4 and IPv6 networks may be employed to proxy content from an IPv4 server over an IPv4 network, translate the content into IPv6, and natively serve the IPv6 content to IPv6 users over an IPv6 network.

Figure 5:
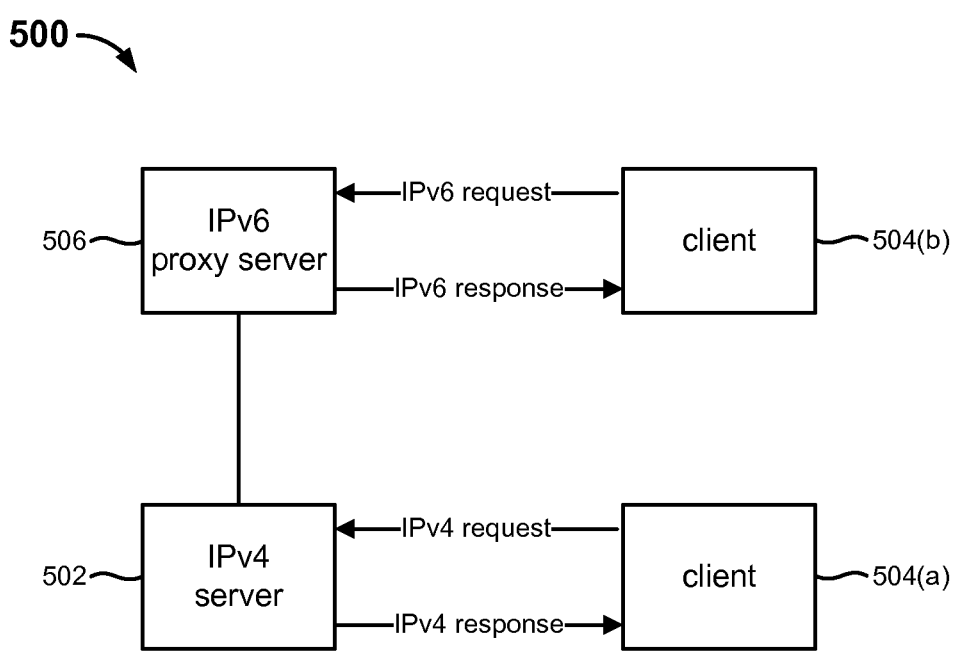
FIG. 5 is a block diagram illustrating an embodiment of a network environment in which a proxy server is employed to translate content from a first format into a second format.

FIG. 5 is a block diagram illustrating an embodiment of a network environment in which a proxy server is employed to translate content from a first format into a second format. For example, network environment 500 may be employed to make the content of an IPv4 accessible website also accessible via IPv6. IPv4 server 502 is connected to and configured to serve content published by a publisher via an IPv4 network. In various embodiments, server 502 may belong to the publisher (e.g., the server may comprise a publisher origin server), a content delivery network contracted by the publisher, or another third party entity employed to serve content on behalf of the publisher. IPv4 server 502 responds to an IPv4 request from client 504(a) with an appropriate IPv4 response. In the given example, IPv6 proxy server 506 comprises a dual stack device that is connected to and configured to natively communicate via both IPv4 and IPv6 networks. In various embodiments, proxy server 506 may belong to the publisher or a third party contracted by the publisher. On its backend, proxy server 506 is configured to proxy content from IPv4 server 502 via an IPv4 network. Proxy server 506 may seed content from server 502 to facilitate site and/or cache acceleration. Proxy server 506 in some cases includes appropriate buffers for translating IPv4 packets obtained from server 502 into IPv6 packets. On its frontend, proxy server 506 is connected to and configured to serve IPv6 content natively via an IPv6 network. IPv6 proxy server 506 responds to an IPv6 request from a client 504(b) with an appropriate IPv6 response. In various embodiments, a client 504 may be redirected to IPv4 server 502 or IPv6 proxy server 506 by a traffic manager such as traffic manager 302 of FIG. 3. Proxy server 506 may in some embodiments also be configured to receive client requests for and serve IPv4 content. In some embodiments, a special server may be interposed between server 502 and proxy server 506 that obtains data from server 502 using a protocol (e.g., UDP (User Datagram Protocol)) that is more amenable to packet fragmentation and that provides data to proxy server 506 in a format that facilitates accelerated packet translation at proxy server 506. Although the example provided with respect to FIG. 5 describes IPv4 to IPv6 translation, proxy server 506 may similarly be employed to translate between any other formats. For instance, proxy server 506 may similarly be employed for IPv6 to IPv4 translation.

Figure 6:
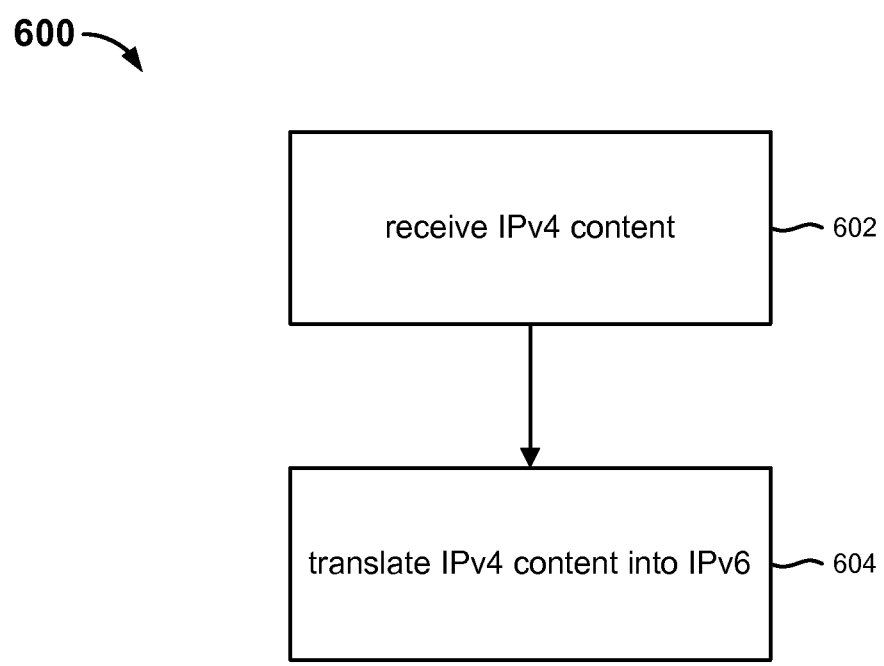
FIG. 6 is a flow chart illustrating an embodiment of a process for translating IPv4 content into IPv6 content.

FIG. 6 is a flow chart illustrating an embodiment of a process for translating IPv4 content into IPv6 content. Although IPv4 to IPv6 translation is described, process 600 may be similarly employed to translate content between any formats. In some embodiments, process 600 is employed by proxy server 506 of FIG. 5. Process 600 starts at step 602 at which IPv4 content is received from an IPv4 server. Such IPv4 content may be received, for example, via an IPv4 network. In some embodiments, step 602 includes appropriately buffering the received IPv4 content. At step 604, the IPv4 content received at step 602 is translated into IPv6. The resulting IPv6 content may be employed to service client requests over an IPv6 network. In various embodiments, IPv4 content may be obtained and translated into IPv6 content using process 600 prior to receiving any client requests for the content or in response to a client request for the content. In some embodiments, the IPv4 content received at step 602 may be employed to service client requests over an IPv4 network. Process 600 may be used, for example, to make IPv4 content also available via IPv6.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
  causing client requests for content published by a content publisher in Internet Protocol version 4 (IPv4) format and hosted by an IPv4 server to be directed or redirected to a traffic management node of a plurality of geographically distributed traffic management nodes by configuring a first domain name of the content publisher to point to a second domain name associated with the traffic management node via a canonical name (CNAME) record of a domain name system (DNS);

receiving, by the traffic management node, a request for the content from a client that has been directed or redirected to the traffic management node as a result of said configuring;

determining, by the traffic management node, communication capabilities of the client based on an ability of the client to access a set of test content; and based on the determined communication capabilities and a traffic management policy specified by the content publisher, directing, by the traffic management node, the request to an Internet Protocol version 6 (IPv6) proxy server or the IPv4 server, wherein the IPv6 proxy server hosts the web page content in IPv6 format, wherein the content was obtained by the IPv6 proxy server from the IPv4 server and translated from the IPv4 format to the IPv6 format.

2. The method of claim 1, wherein the request comprises a Hypertext Transfer Protocol request, a Secure Sockets Layer request, a File Transfer Protocol request, a Real Time Messaging Protocol request or an Encrypted Real Time Messaging Protocol request.

3. The method of claim 1, wherein the content hosted by the IPv6 proxy server in IPv6 format was proactively translated from the IPv4 format to the IPv6 format prior to receiving any requests for the content.

4. The method of claim 1, wherein the traffic management policy specifies use of a communication format supported by the client that is expected to provide the client with superior performance.

5. The method of claim 4, further comprising determining, by the traffic management node, whether the request has been tunneled.

6. The method of claim 5, wherein said determining, by the traffic management node, whether the request has been tunneled includes comparing a source Internet Protocol (IP) address of the request with a list of known IP addresses associated with tunneling services.

7. The method of claim 4, wherein the client is natively connected to an IPv6 network and wherein the traffic management policy specifies use of the IPv6 format to avoid performance degradations inherent in tunneling communications over incompatible networks.

8. The method of claim 4, wherein the client is natively connected solely to an IPv4 network and wherein the traffic management policy specifies use of the IPv6 format.

9. The method of claim 4, wherein the client is dual stack and natively connected to both an IPv4 network and an IPv6 network.

10. A traffic management node comprising:
a non-transitory storage device having embodied therein one or more routines; and
one or more processors coupled to the non-transitory storage device and operable to execute the one or more routines to perform a method comprising:
receiving a request for the content from a client that has been directed or redirected to the traffic management node as a result of said configuring;
determining communication capabilities of the client based on an ability of the client to access a set of test content; and
based on the determined communication capabilities and a traffic management policy specified by the content publisher, directing the request to an Internet Protocol version 6 (IPv6) proxy server or the IPv4 server, wherein the IPv6 proxy server hosts the web page content in IPv6 format, wherein the content was obtained by the IPv6 proxy server from the IPv4 server and translated from the IPv4 format to the IPv6 format.

11. The traffic management node of claim 10, wherein the request comprises a Hypertext Transfer Protocol request, a Secure Sockets Layer request, a File Transfer Protocol request, a Real Time Messaging Protocol request or an Encrypted Real Time Messaging Protocol request.

12. The traffic management node of claim 10, wherein the content hosted by the IPv6 proxy server in IPv6 format was proactively translated from the IPv4 format to the IPv6 format prior to receiving any requests for the content.

13. The traffic management node of claim 10, wherein the traffic management policy specifies use of a communication format supported by the client that is expected to provide the client with superior performance.

14. The traffic management node of claim 13, wherein the client is natively connected to an IPv6 network and wherein the traffic management policy specifies use of the IPv6 format to avoid performance degradations inherent in tunneling communications over incompatible networks.

15. The traffic management node of claim 13, wherein the client is natively connected solely to an IPv4 network and wherein the traffic management policy specifies use of the IPv6 format.

16. The traffic management node of claim 13, wherein the client is dual stack and natively connected to both an IPv4 network and an IPv6 network.

17. The traffic management node of claim 13, wherein the method further comprises determining, by the traffic management node, whether the request has been tunneled.

18. The traffic management node of claim 17, wherein said determining whether the request has been tunneled includes comparing a source Internet Protocol (IP) address of the request with a list of known IP addresses associated with tunneling services.

* * * * *